F. HARDINGE.
CARRIAGE FEED MECHANISM FOR LATHES.
APPLICATION FILED NOV. 11, 1916.
1,285,694.
Patented Nov. 26, 1918.
3 SHEETS—SHEET 1.
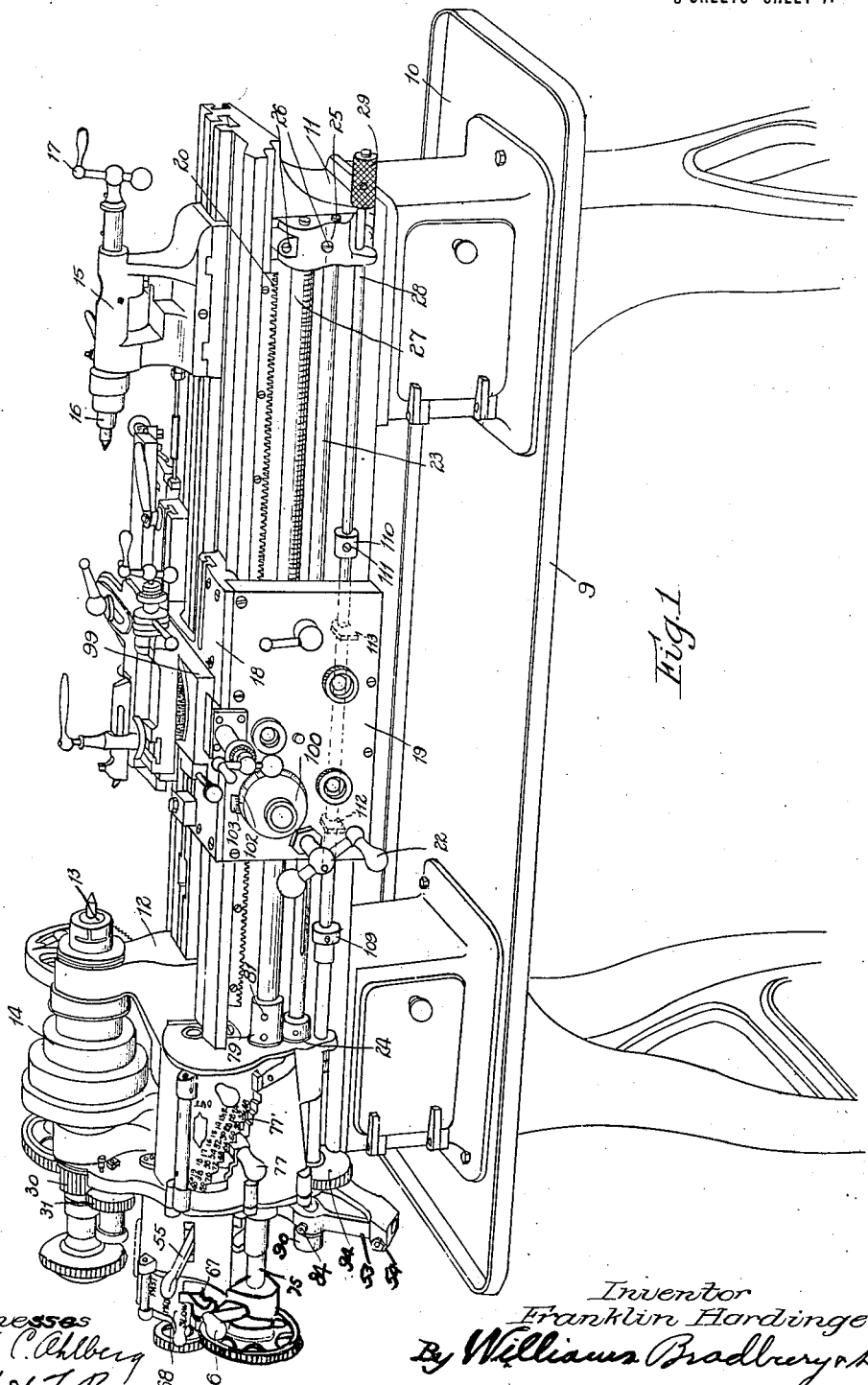

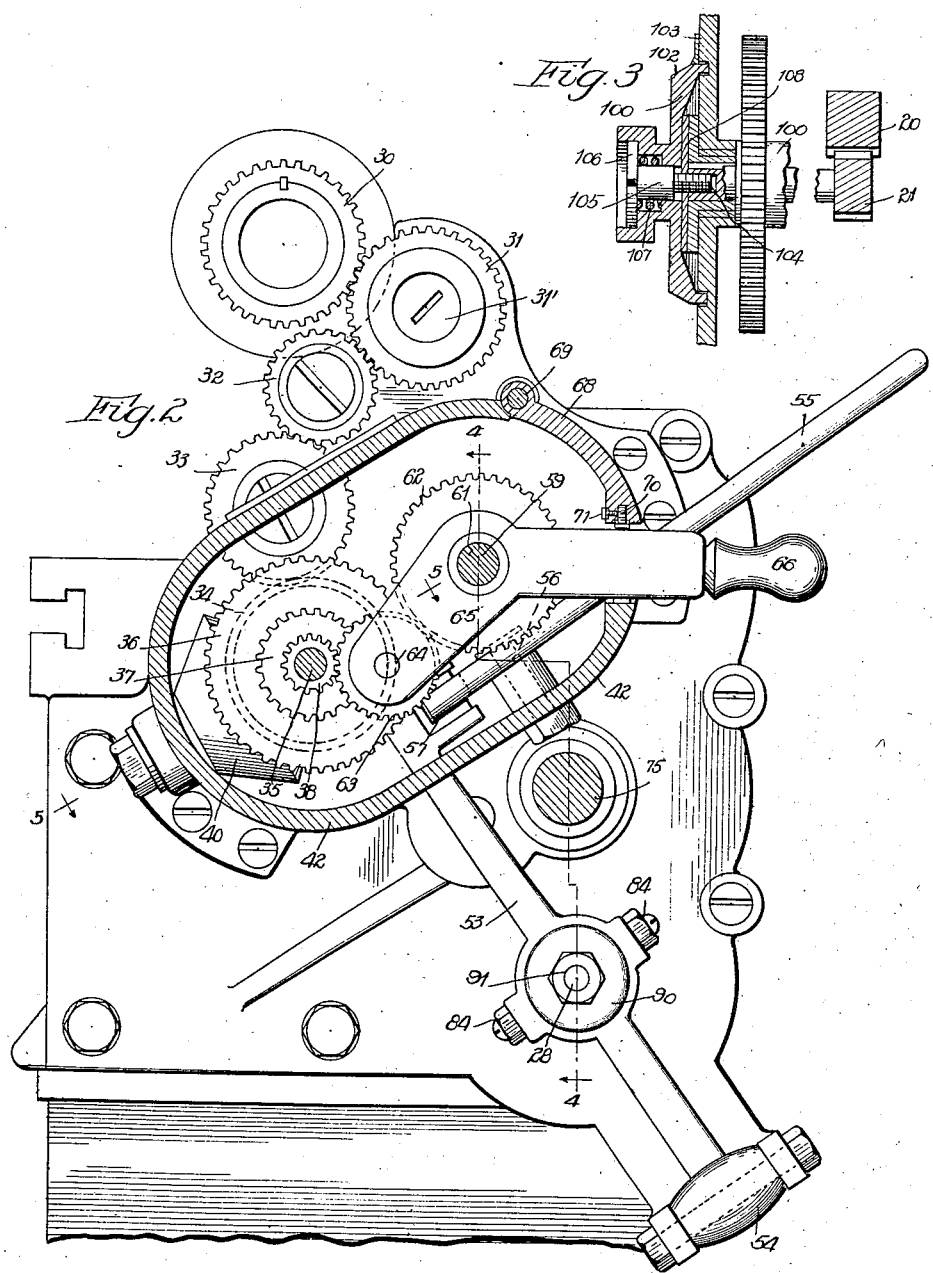

F. HARDINGE.
CARRIAGE FEED MECHANISM FOR LATHES.
APPLICATION FILED NOV. 11, 1916.
1,285,694.
Patented Nov. 26, 1918.
3 SHEETS—SHEET 3.
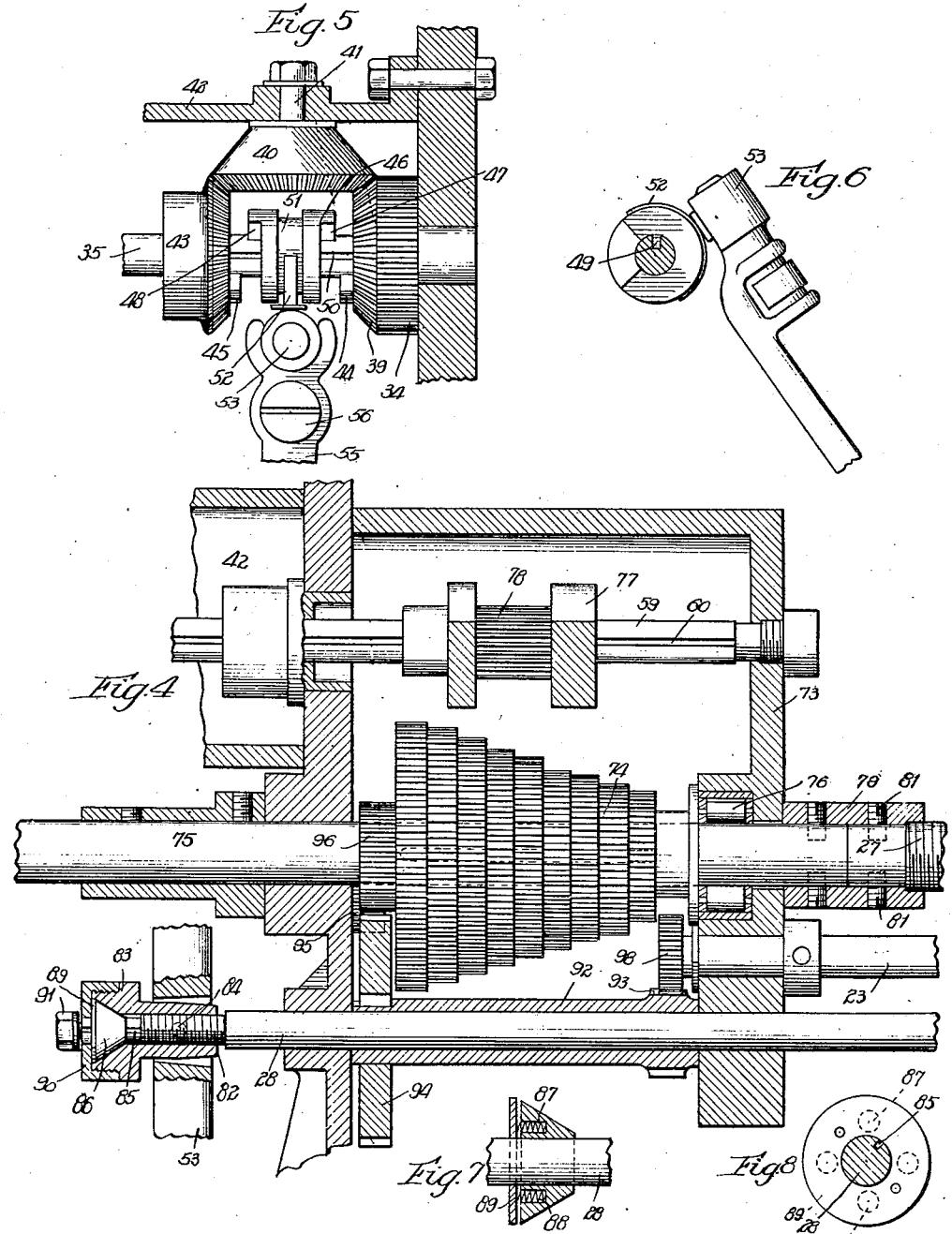
Witnesses:
Albin C. Ahlberg
Robert F. Bracke
Inventor
Franklin Hardinge
By William Bradbury Lee
Attorneys

UNITED STATES PATENT OFFICE.

FRANKLIN HARDINGE, OF CHICAGO, ILLINOIS, ASSIGNOR TO HARDINGE BROTHERS, OF CHICAGO, ILLINOIS, A CORPORATION OF ILLINOIS.

CARRIAGE-FEED MECHANISM FOR LATHES.

1,285,694.  Specification of Letters Patent.  Patented Nov. 26, 1918.

Original application filed January 28, 1915, Serial No. 4,841. Divided and this application filed November 11, 1916. Serial No. 130,727.

*To all whom it may concern:*

Be it known that I, FRANKLIN HARDINGE, a citizen of the United States, residing at Chicago, in the county of Cook and State of Illinois, have invented a certain new and useful Improvement in Carriage-Feed Mechanism for Lathes, of which the following is a full, clear, concise, and exact description, reference being had to the accompanying drawings, forming a part of this specification.

My invention relates to lathe constructions and has for its object the provision of an improved form of carriage feed mechanism which is positive and accurate in its operation.

This application is a division of my co-pending application Serial No. 4,841, filed January 28, 1915, covering improvements in quick-change swing precision lathes.

One of the features of the present invention is the provision of automatic stop mechanism associated with the carriage for interrupting movement of the carriage relative to the lathe bed when the carriage has made a certain predetermined travel. It is one of the objects of the present invention to provide means whereby the stop mechanism may be set accurately and to obtain this result I provide a stop rod arranged parallel with the feed rod usually employed on a lathe, the rod being provided with adjustable collars arranged to be engaged by the carriage when the stop mechanism is to be operated. The collars are adapted for longitudinal movement on the rod so as to permit setting of the collars. After the collars have been set to the approximate position desired the entire stop rod may be moved longitudinally of the carriage so that the collars may be moved to exactly the position required.

Another feature of the present invention is the provision of novel gearing extending between the lead screw and the feed rod, which gearing is located in the change gear casing of the lathe and serves to provide rotation of the feed rod when the lead screw shaft is rotated.

Another object of the present invention is the provision of a friction index carried by the apron of the carriage and arranged to indicate to the operator the extent of travel of the carriage relative to the lathe bed. The index in the preferred form of my invention takes the form of a circular plate frictionally connected with a rotatable shaft for causing movement of the carriage relative to the lathe. The circular plate, due to its frictional connection with the rotatable shaft, may be reset to zero or any other point of the scale provided in conjunction with the plate when the operator so desires regardless of the position of the carriage.

A further object of the present invention is the provision of means whereby the lead screw may be removed when desired and a new screw substituted therefor.

These and other objects of the invention will be more fully brought out in connection with the accompanying drawings wherein, Figure 1 is a front perspective view of a lathe incorporating the carriage feed mechanism of my invention, Fig. 2 is an end elevational view of the head of the lathe, some of the parts being broken away to more clearly illustrate the interior construction, Fig. 3 is a detail cross sectional view of the friction index associated with the mechanism for causing longitudinal movement of the lathe carriage, Fig. 4 is a fragmentary cross sectional view taken along the line 4—4 of Fig. 2 and looking in the direction indicated by the arrows and shows the automatic stop mechanism together with the back gearing extending between the lead screw shaft and the feed rod, Fig. 5 is a fragmentary cross sectional view taken along the line 5—5 of Fig. 2 looking in the direction indicated by the arrows, Fig. 6 is a fragmentary elevational view of the automatic stop rod lever and its co-operating clutch member, Fig. 7 is an enlarged sectional detail view of the friction mechanism employed in connection with the automatic stop rod; and Fig. 8 is an end view of Fig. 7.

Similar characters of reference refer to similar parts throughout the several views.

Referring first to Fig. 1, 9 illustrates a support or table containing a shelf 10 upon which is mounted a lathe bed 11. The head stock of the lathe is shown at 12 containing the head stock spindle 13 connected with the pulleys 14 arranged to receive power from any suitable source. The tail stock is illustrated at 15 containing the tail stock spindle 16 arranged to be moved longitudinally relative to the tail stock 15 by means of a handle 17. The head stock 12 and the tail stock 15 are slidably mounted on the lathe bed in the usual manner so as to permit longitudinal movement of either one relative to the lathe bed. The carriage is shown at 18 slidably mounted on the upper face of the lathe bed and has projecting downwardly over the front of the lathe the usual apron 19.

A gear rack 20 is attached to the front end of the lathe and coöperates with a pinion 21 (Fig. 3) arranged to be operated by means of a handle 22, or the feed rod shown at 23. The feed rod 23 is supported in the bearings 24 and 25 located respectively at the head and tail end of the lathe bed. The bearing member 25 is attached to the lathe bed by means of the screws 26—26 which permit the removal of the bearing member when it is desired. The right hand end of the lead screw 27 (Fig. 1) is journaled in the bearing 25, as is the right hand end of the automatic stop rod 28. The automatic stop rod, however, extends entirely through the bearing 25 and has attached to its outer end the knurled finger piece 29 which permits the stop rod 28 to be manually rotated for the purpose subsequently to be described.

Referring now to Fig. 2, 30 illustrates a pinion mounted on the head stock spindle 13, which pinion meshes with a gear 34 through the intermediate gears 31, 32, and 33. The gear 31 is arranged to have longitudinal movement relative to its shaft 31' so that the train extending between the gear 30 and the gear 34 may be interrupted when it is desired by moving the gear 31 outwardly out of mesh with the gear 32. The gear 34, as shown in Figs. 2 and 5, is loosely mounted on the shaft 35 which has rigidly attached to it three gears 36, 37, and 38 having respectively sixty, thirty, and fifteen teeth. The gear 34 contains the beveled gear 39 meshing with an intermediate beveled gear 40 journaled at 41 in a casing 42. A second beveled gear 43 meshes with the beveled gear 40 and is loosely mounted on the shaft 35, as shown in Fig. 5, so as to rotate in a direction opposite to the rotation of the gear 34, and thus the beveled gear 39. The beveled gear 39 carries a lug 44 and the beveled gear 43 carries a lug 45, which lugs serve to form clutch members arranged to coöperate with the shiftable clutch member 46 provided with the lateral lugs 47 and 48. The clutch member 46 is provided with a key 49 (Fig. 6) extending into a keyway 50 provided in the shaft 35. This construction enables the clutch member 46 to move longitudinally relative to the shaft 35, but prevents any angular movement of the clutch member relative to its shaft. When the clutch 46 is in the position shown in Fig. 5 the gears 39 and 43 may be rotated without imparting movement to the clutch member. When, however, the clutch member 46 is moved to the right (Fig. 5) it is caused to move in unison with the gear 39. Similarly, if the clutch is moved to the left in this figure it will be caused to move with the gear 43 in the direction opposite to the direction of rotation of the gear 34.

The clutch member 46 is provided with a groove 51 into which extends an arm 52 attached to the upper end of the lever 53 pivoted at its lower end 54 (Fig. 2) to the lathe bed. It will be seen from the construction just referred to that movement of the lever 53 upon its pivot 54 will cause the clutch member 46 to engage with or disengage from the beveled gears 39 and 45. To facilitate manual shifting of the lever 53 a handle 55 is employed which is pivoted at 56 to the casing 42 and contains a bifurcated end 57 straddling the roller 58 carried by the arm 53.

Extending parallel with the shaft 35 is a shaft 59 (Figs. 2 and 4) containing a keyway 60 into which extends a key 61 carried by a gear 62. The gear 62 meshes with an intermediate gear 63 journaled at 64 in a bracket 65 provided with a handle 66 extending through the casing 42. As most clearly shown in Fig. 1, the front side of the casing 42 is stepped, as shown at 67, to allow the handle 66 to be moved to a position where the intermediate gear 63 is allowed to mesh with either one of the three gears 36, 37, and 38. To lock the handle 66 in any position to which it may be set the cover 68 is provided which is pivoted at 69 to the casing. This cover is provided with steps corresponding with the steps of the casing 42. In order that the handle 66 may be held in the exact position whereby the intermediate gear 63 satisfactorily meshes with one of the gears 36, 37, and 38 the cover 68 contains three adjusting screws, one of which is shown at 70, arranged to be held in place by means of a set screw 71. By releasing the set screw 71 the screw 70 may be raised or lowered to the desired position.

The shaft 59 extends inwardly from the handle 66, as shown in Fig. 4, to a change gear casing 73 containing a stack of gears 74 mounted upon a lead screw shaft 75. This shaft 75 bears in the casing 73, as shown and also in the bearings 76 retained by the casing. That portion of the shaft 59 which extends within the casing 73 is provided with a handle 77 loosely mounted on the shaft 59. This handle has journaled on it an intermediate gear, not shown, meshing with the pinion 78 keyed to the shaft 59. The pinion 78 is thus prevented from moving angularly relative to the shaft 59, but is permitted to move longitudinally relative thereto. The handle 77, as most clearly shown in Fig. 1, extends through the casing 73 to be manually operated. By moving the handle 77 into the desired one of several steps 77', shown in Fig. 1, the intermediate gear above referred to meshing with the pinion 78 may be moved into mesh with any one of the stack of gears 74 to obtain the desired gear ratio between the shaft 59 and the shaft 75. The shaft 75 extends outwardly through the casing 73, as shown in Fig. 4, and has attached to its outer end a collar 79 which projects outwardly beyond the end of the shaft 75 to receive one end of the lead screw 27. The screws shown at 81—81 serve to connect the lead screw 27 with the collar 79 and thus cause rotation of the lead screw with the shaft 75.

The automatic stop rod 28 extends through the casing 73, as shown in Fig. 4, and is provided at its lefthand end with the threaded portion 82 screw-threading into a nut 83 pivoted at 84 to the lever 53 intermediate its ends. The extreme lefthand end of the stop rod 28 (Fig. 4) is provided with a keyway 85 arranged to receive a key carried by the truncated cone 86. This cone, as most clearly shown in Fig. 7, contains a plurality of sockets 87, preferably four in number, each socket containing a helical compression spring 88 acting between the truncated cone and a washer 89 positioned between the cone and a cap 90 threading onto the nut 83. The function of the springs 88 is to hold the truncated cone 86 against the surface 86' of the nut 83 so that a frictional contact always exists between the automatic stop rod 28 and the nut 83 which prevents angular displacement of the stop rod relative to the nut 83 unless the stop rod is manually rotated. If desired a nut 91 may be secured to the outer end of the stop rod 28 to limit movement thereof. From the construction just described it will be observed that by turning the knurled finger piece 29 of the automatic stop rod that the rod may be moved longitudinally relative to the lathe bed due to the threaded connection between the rod and the nut 83.

Mounted within the casing 73 and around the automatic stop rod 28 is a sleeve 92 carrying a pinion 93 and a gear 94, the latter of which meshes with an intermediate gear 95 in turn meshing with a pinion 96 carried by the shaft 75. The feed rod is shown at 23 extending into the gear change casing and provided with a pinion 98 meshing with the pinion 93. It will thus be observed that power is applied to the feed rod 23 from the shaft 75 and this is accomplished in a minimum amount of space and without the employment of extra operating shafts since the sleeve 92 is mounted for rotation upon the automatic stop rod.

The lead screw 27 and the feed rod 23 extend behind the carriage apron 19 in the usual manner and are arranged to coöperate with mechanism well known for moving the carriage longitudinally relative to the bed and for moving the cross feed 99 transversely of the bed. The feed rod 23 is provided with the usual keyway into which extends a key carried by a gear slidably mounted on the feed rod, all of which mechanism is common and needs no further explanation. In moving the carriage longitudinally the shaft 100 (Fig. 3) is rotated either by means of the feed rod 23 or by means of the hand feed 22 thereby causing rotation of the pinion 21, which is mounted on the shaft 100, and movement of the carriage relative to the lathe. The outer end of the shaft 100 has frictionally connected with it an index plate 101 provided with graduations, as shown at 102, arranged to coöperate if desired with a Vernier scale 103 fixed to the apron 19. The frictional connection between the index plate 101 and the shaft 100 is provided in the following manner: The outer end of the shaft 100 contains an internally threaded socket 104 into which is arranged to thread a screw 105 carrying an enlarged head 106. A helical compression spring 107 is interposed between the head 106 of the screw and the index plate 101 which serves to hold the index plate into frictional contact with a resilient washer 108 positioned between the index plate and the shaft 100. As the shaft 100 is rotated and the carriage moved the index plate 101 is rotated a corresponding degree so that the operator may ascertain the extent of movement of the carriage. After the carriage has moved to the position desired by the operator he may interrupt its movement and reset the index plate 101 to zero or to any other mark of the scale regardless of the position of the carriage.

The stop rod 28 has mounted thereon two collars 109 and 110 which are adapted to have longitudinal movement relative to the stop rod to permit setting of the collars and are each provided with a set screw 111 which enables the collar to be fixed to the stop rod. The carriage 19 contains two abutment members 112 and 113 arranged when the carriage is moved either to the left or to the right the required extent to engage either the collar 109 or the collar 110. The operation of the automatic stop mechanism is as follows: Assuming that the carriage 19 is to be moved to the left (Fig. 1) a certain predetermined amount, the collar 109 is released from the stop rod and shifted relative thereto until it assumes approximately the position where it will be engaged by the abutment 112 when the carriage is moved the said predetermined amount. The collar 109 is then fixed to the stop rod by means of its set screw and the stop rod 28 rotated by means of the knurled finger piece 29 to bring the collar 109 to the exact position required, the direction of rotation manually imparted to the stop rod 28, of course, depending upon the direction in which the collar 109 is intended to be moved. Power is then applied to one of the pulleys 14 of the head stock and the lever 55 thrown to the left (Fig. 1) to bring the clutch 46 into engagement with the clutch 44 of the beveled gear 39. The carriage will then be caused to move toward the head stock of the lathe and will continue to do so until the abutment 112 engages the collar 109 whereupon the entire stop rod 28 is moved with the carriage with the result that the lever 53 is swung upon its pivot 54 to release the clutch 46 from the clutch 44. This operation will serve to disconnect the shaft 35 from the source of power and thus interrupt the travel of the carriage. The collar 111 serves to act as a medium whereby movement of the carriage toward the tail stock of the lathe is limited, in which case the rod 28 is moved by the carriage in the opposite direction to swing the lever 54 to release the clutch 46 from the clutch 45.

If for any reason it is desired to remove the lead screw 27 this may be done by removing the bearing member 25 and releasing the lead screw from the collar 79 by removing the screws 81. A new lead screw may then be inserted to replace the one removed. If a lead screw having a different pitched thread is substituted for the one removed substitution of the coöperating nut carried by the apron is, of course, necessary. It frequently happens, however, that an operator may use two or more lead screws having the same threads but containing different qualities so that one is to be used for rough work and the other for accurate work. These may be interchanged as the condition requires in the manner above described.

Having thus described my invention what I claim as new and desire to secure by Letters Patent of the United States is:

1. Automatic stop mechanism for a lathe comprising a stop rod coöperating with a lathe carriage, adjustable collars mounted on the rod arranged to have engagement with said carriage, a clutch member, adjustable connecting means between said rod and clutch lever, and means at the opposite end of said rod for adjusting said connecting means.

2. Automatic stop mechanism for a lathe comprising a stop rod coöperating with a lathe carriage, adjustable collars mounted on the rod arranged to have engagement with said carriage, a clutch lever and adjustable friction connecting means between said rod and clutch lever.

3. Automatic stop mechanism for a lathe comprising a stop rod coöperating with a lathe carriage, adjustable collars mounted on the rod arranged to have engagement with said carriage, a clutch lever, a nut mounted on said lever and a threaded portion carried by said rod having threaded engagement with said nut so that the rod may be adjusted longitudinally relative to the clutch lever.

4. Automatic stop mechanism for a lathe comprising a stop rod coöperating with a lathe carriage, adjustable collars mounted on the rod arranged to have engagement with said carriage, a clutch lever, a nut mounted on said lever, a threaded portion carried by said rod having threaded engagement with said nut so that the rod may be adjusted longitudinally relative to the clutch lever and frictional retaining means between said rod and nut.

5. Automatic stop mechanism for a lathe comprising a stop rod coöperating with the lathe carriage, adjustable collars mounted on the rod arranged to have engagement with said carriage, a clutch lever, a nut pivotally mounted on said lever, and a threaded portion carried by said rod having threaded engagement with said nut so that the rod may be adjusted longitudinally relatively to the clutch lever.

6. Automatic stop mechanism for a lathe comprising a stop rod coöperating with a lathe carriage, adjustable collars mounted on the rod arranged to have engagement with said carriage, a clutch lever, a nut pivotally mounted on said lever, a threaded portion carried by said rod having threaded engagement with said nut so that the rod may be adjusted longitudinally relative to the clutch lever and frictional retaining means between said rod and nut.

7. A lathe comprising a bed, a lead screw shaft carried by the bed, a cone of transmission gears mounted on said shaft, means for driving said shaft, a feed rod supported by the bed parallel to said shaft and back gearing connecting said shaft and feed rod, said back gearing arranged to extend from the outside of the large gear of the cone to the outside of the small gear of the same.

8. A lathe comprising a bed, a lead screw shaft carried by the bed, means for driving said shaft, a feed rod supported by the bed parallel to the lead screw shaft, a stop rod disposed parallel to said feed rod and back gearing rotatably mounted on the stop rod connecting said shaft and feed rod.

9. A lathe comprising a carriage slidably mounted on the bed, a rack carried by the bed, a pinion on said carriage meshing with said rack, means for rotating said pinion to cause longitudinal movement of the carriage and an index frictionally connected with said means.

10. In a lathe the combination with a live spindle and a lathe carriage of a lead screw, a shaft, change speed gear connections between said live spindle and said shaft and between said lead screw and said shaft, a pair of pinions rotatably mounted upon said shaft in spaced relation and provided on their adjacent faces with clutch members, a clutch member splined to said shaft intermediate said pinions, manual means for shifting said clutch member into engagement with either of said clutch members, and automatic means for disengaging said clutch member from either of said clutch members comprising a lever pivoted intermediate its ends, a stop rod pivotally connected to the end of said lever and slidably mounted and provided with adjustable stops adapted to be engaged by said carriage.

11. In a lathe the combination with a live spindle and a lathe carriage of a lead screw, a shaft, change speed gear connections between said live spindle and said shaft and between said lead screw and said shaft, a pair of pinions rotatably mounted upon said shaft in spaced relation and provided on their adjacent faces with clutch members, a clutch member splined to said shaft intermediate said pinions, manual means for shifting said clutch member into engagement with either of said clutch members, and automatic means controlled by the movement of said carriage for disengaging said clutch member from either of said clutch members.

12. In a lathe the combination with a live spindle and a lathe carriage of a lead screw, a shaft, gear connections between said live spindle and said shaft and between said lead screw and said shaft, a pair of pinions rotatably mounted upon said shaft in spaced relation and provided on their adjacent faces with clutch members, a clutch member splined to said shaft intermediate said pinions, manual means for shifting said clutch member into engagement with either of said clutch members, and automatic means controlled by the movement of said carriage for disengaging said clutch member from either of said clutch members.

13. In a lathe the combination with a live spindle and a lathe carriage of a lead screw shaft, a feed rod geared to said lead screw shaft, change speed gear connections between said live spindle and said lead screw shaft including means for reversing the direction of rotation of said lead screw shaft and for disconnecting said lead screw shaft from said live spindle, and means for automatically actuating said last named means to stop said carriage at any desired position comprising a stop rod and an adjustable stop secured to said stop rod on either side of said carriage.

14. In a lathe the combination with a live spindle and a lathe carriage of a lead screw shaft, gear connections between said live spindle and said lead screw shaft including means for reversing the direction of rotation of said lead screw shaft and for disconnecting said lead screw shaft from said live spindle, adjustable means controlled by the movement of said carriage for automatically actuating said last named means to stop said carriage at any desired position, and means at the end of said lead screw shaft opposite said gear connections for adjusting said last named means.

15. A lathe comprising a carriage slidably mounted on the bed thereof, means for moving said carriage relatively to said bed, and means mounted on said carriage for indicating the extent of said movement comprising an index actuated by said moving means and frictionally engaged therewith and a Vernier scale co-acting with said index.

16. A lathe comprising a carriage slidably mounted on the bed thereof, means for moving said carriage relatively to said bed, and means mounted on said carriage for indicating the extent of said movement comprising an index actuated by said moving means and frictionally engaged therewith.

17. A lathe comprising a carriage slidably mounted upon the bed thereof, means for moving said carriage relatively to said bed, and means mounted on said carriage and adjustable thereto for indicating the extent of said movement.

18. In a lathe the combination with a carriage of means for driving said carriage and means for disconnecting said driving means from said carriage comprising a lever, a stop rod adjustably connected to said lever, adjustable stops on said stop rod, and means at the end of said rod opposite said lever for adjusting said stop rod longitudinally of said carriage to alter the position of said stops relative to said carriage.

19. In a lathe the combination with a carriage of a lead screw shaft, a feed rod, means for driving said lead screw shaft, means for disconnecting said driving means from said lead screw shaft comprising a stop rod actuated by said carriage, and gear connections between said lead screw shaft and said feed rod, part of said gears being rotatably mounted upon said stop rod.

In witness whereof, I hereunto subscribe my name this 3rd day of November, A. D., 1916.

FRANKLIN HARDINGE.

Witnesses:
ROBERT F. BRACKE,
ALVIN C. AHLBERG.